United States Patent [19]

Hodgson, Jr. et al.

[11] Patent Number: 4,820,590

[45] Date of Patent: Apr. 11, 1989

[54] ORIENTED ELASTOMERIC FILM AND METHOD OF MANUFACTURE

[75] Inventors: William J. Hodgson, Jr., Baytown; Jeffrey A. Middlesworth, Webster, both of Tex.

[73] Assignee: Exxon Chemical Patents Inc., Linden, N.J.

[21] Appl. No.: 123,774

[22] Filed: Nov. 23, 1987

Related U.S. Application Data

[62] Division of Ser. No. 732,127, May 8, 1985, Pat. No. 4,714,953.

[51] Int. Cl.$^4$ .............................................. B32B 27/08
[52] U.S. Cl. ................................................... 428/516
[58] Field of Search ........................................ 428/516

[56] References Cited

U.S. PATENT DOCUMENTS

| | | | |
|---|---|---|---|
| 3,378,512 | 4/1968 | Haued et al. | 524/518 |
| 3,927,144 | 12/1975 | Hayashi et al. | 524/518 |
| 3,941,859 | 3/1976 | Batiuk et al. | 525/211 |
| 4,116,914 | 9/1978 | Coran et al. | 525/222 |
| 4,132,698 | 1/1979 | Gessler et al. | 524/518 |
| 4,212,787 | 7/1980 | Matsuda et al. | 524/518 |
| 4,277,578 | 7/1981 | Yoshimura et al. | 525/211 |
| 4,480,061 | 10/1984 | Coughlin et al. | 525/222 |

FOREIGN PATENT DOCUMENTS

| | | | |
|---|---|---|---|
| 57-2350 | 1/1982 | Japan | 525/211 |
| 57-177038 | 10/1982 | Japan | 524/518 |
| 57-177039 | 10/1982 | Japan | 524/518 |
| 61-284439 | 12/1986 | Japan | 428/516 |
| 62-169642 | 7/1987 | Japan | 428/516 |
| 62-176843 | 8/1987 | Japan | 428/516 |

*Primary Examiner*—Joseph L. Schofer
*Assistant Examiner*—N. Sarofim
*Attorney, Agent, or Firm*—R. L. Graham; H. L. Cohen

[57] ABSTRACT

An oriented thermoplastic elastomer comprising an elastomer, EVA, and process oil is prepared by stretch orienting the film at an elevated temperature and annealing the film to freeze in stresses and strains in the film. In one embodiment, the thermoplastic elastomer is provided with a thin coating of a thermoplastic to provide nonblocking.

6 Claims, No Drawings

ORIENTED ELASTOMERIC FILM AND METHOD OF MANUFACTURE

This is a division of application Ser. No. 732,127 filed 5/8/85 now U.S. Pat. No. 4,714,953.

BACKGROUND OF THE INVENTION

This invention relates generally to the thermoplastic elastomers and in particular, to the thermoplastic elastomers which have been thermally oriented.

Thermoplastic elastomers possess properties of both thermoplastics and elastomers and have a wide range of applications. In certain applications, a thermoplastic elastomer film is dimensionally stabilized in a stretched condition (wherein stresses and strains in the film have been frozen in) for subsequent use. For example, the stretched thermoplastic elastomer may be applied to a substrate and later heated causing the thermoplastic elastomer to shrink and retain substantial elastic properties. One such use is disclosed in European patent application No. 84301717.9 (Publication No. 0119815) wherein the stretched dimensionally stable thermoplastic elastomer is placed on a diaper waistband and reheated causing the thermoplastic elastomer to contract and revert to a heat stable elastic state. The diaper thus, is provided with a flexible and stretchable waistband. A similar application of thermoplastic elastomers is disclosed in European patent application No. 84301720.38 (Publication No. 0119827). These publications are cited merely to disclose a possible use of thermoplastic elastomers.

In many applications, particularly where the thermoplastic elastomer is secured to a substrate for later contraction by the application of heat, it is important that the thermoplastic elastomer have relatively high shrink force since the substrate resists shrinkage. The shrink force is determined by measuring the shrinkage of the film sample against an applied force and is referred to herein as weighted shrink. The weighted shrink properties differ markedly from free shrinkage (no applied weight) and hence is a key property in determining the suitability of a heat shrinkable film on substrates.

U.S. Pat. No. 4,303,571, issued to D. S. Jansen et al disclose a thermoplastic elastomer film comprising 25 to 55 parts by weight of an ethylene-propylene copolymer, 35 to 55 parts by weight of an EVA copolymer and 15 to 25 parts by weight of a liquid hydrocarbon process oil.

As will be demonstrated in the discussion of the comparative examples contained herein, the elastomeric film made from the composition disclosed in U.S. Pat. No. 4,303,571 possesses satisfactory shrink properties, but not nearly as good as those possessed by the composition of the present invention, particularly with respect to weighted shrink properties.

A problem associated with thermoplastic elastomers is tackiness which impedes unwinding of the film during processing. This is a particularly serious problem with film compositions containing EVA and processing oil. Moreover, addition of particulate antiblocks are not particularly effective in thermoplastic elastomers because of the difficulty in dispersing the additives uniformly on the film surface, since the additives tend to concentrate in the elastomer phase.

SUMMARY OF THE INVENTION

The present invention provides an improved film composition and process for manufacturing which exhibits excellent shrink force and possesses nonblocking properties.

The film composition in one embodiment of the present invention comprises from 10 to 40 weight percent of an olefinic elastomer, not more than 12 weight percent (preferably not more than 10 weight percent) of a normal liquid processing oil, and from 50 to 80 weight percent of a thermoplastic ethylene copolymer, preferably vinyl acetate copolymer (EVA), all weight percents based on the weight of the three component composition. The film is dimensionally stable in a stretched condition (draw ratio of 1.3:1 to 6:1) and is contractible to a thermally stable and elastic condition by the application of heat.

The method for preparing the thermoplastic elastomer film comprises stretching the film at a temperature below the melting point of the EVA component at a draw ratio between about 1.3:1 and 6:1, annealing the stretched film, and cooling of the film to ambient temperature. The film may be used by securing it to a substrate such as a inelastic thermoplastic or fabric, and heating the film to an elevated temperature whereby the film contracts to a thermally stable length and possesses elastic properties. The composite thus may be expanded by the application of tension which upon release returns to its original shape.

In another embodiment of the invention, the film comprises a composite of one layer of a thermoplastic elastomer and a thin coating of an ethylene polymer or copolymer having a relatively high Melt Index. Upon the subsequent stretch orienting the composite, the coating becomes even thinner. The thermoplastic elastomer layer is preferably the composition as defined above, particularly if high shrink force is desired in addition to antiblock properties. The coating preferably also contains particulate antiblock additives, thus avoiding the difficult problem of distributing antiblock particles on or near the film surface.

The present invention contemplates (1) an improved stretch-oriented, dimensionally stable thermoplastic elastomer which is shrinkable upon application of heat, (2) a composite of the thermoplastic elastomer and a substrate wherein the orientation has been released by the application of heat, (3) a method of preparing the oriented thermoplastic elastomer film, (4) a method of manufacturing an elastic composite comprising a thermoplastic elastomer and a substrate of inelastic material, (5) a thermoplastic elastomer having a thin coating of a nonblocking polymer and (6) a method of preparing a nonblocking thermoplastic elastomer.

DESCRIPTION OF THE PREFERRED EMBODIMENTS

In describing the present invention, it is necessary to use certain technical terms, some of which are commonly used in the industry and others of which are defined herein to express a concept.

In order to avoid confusion, the following terms used herein shall have the meaning indicated:

"Draw ratio"—the ratio of the final stabilized length (after orientation and "snapback") of an oriented film and the initial length of the film before orientation. Draw ratio in unidirectional orientation is also equal to the ratio of the thickness of the stabilized oriented film and the initial unoriented film.

"Shrink force"—the force required to prevent shrinkage of an oriented film by application of heat.

"Shrink stress"—the shrink force per unit area (g/cm$^2$).

"Annealing"—a heat treatment process for reducing strains and stresses set up in the film during orientation. The process comprises maintaining the film while in stretched condition at the annealing temperature, for a period of time, followed by cooling the film to room temperature.

"Thermoplastic elastomer"—frequently called rubbery thermoplastics, are blends of a thermoplastic material and elastomer that are processable as a melt, at elevated temperatures, but exhibit properties similar to vulcanized elastomers at room temperature.

"Melt Index" (MI)—g/10 min (ASTM-D 1238; condition E).

In its broadest form, the thermoplastic elastomer film composition of the present invention comprises three main components, (1) olefinic elastomer, (2) ethylene copolymer and (3) a hydrocarbon process oil.

The concentrations of the three components of the blend are as follows:

| Component | Concentration | Preferred Concentration | Most Preferred |
|---|---|---|---|
| Olefinic Elastomer | 10–40 wt % | 15–30 wt % | 20–30 wt % |
| Ethylene Copolymer | 50–80 wt % | 60–80 wt % | 65–75 wt % |
| Process Oil | 0–12 wt % | 2–10 wt % | 4–8 wt % |

The above concentration range may be combined in any permissible combination, although the particular combinations shown are preferred. For example, a preferred composition comprises 10–40 wt % elastomer, 60–80 wt % ethylene copolymer, and 0–12 wt % process oil. The weight concentration of each component is based on the total weight of the three main components.

Elastomer Component: The olefinic elastomer component of the composition preferably comprises an ethylene copolymer elastomer, such as a copolymer of ethylene with higher alpha-olefin. Preferred ethylene elastomer copolymers include EPM (ASTM D-1418-72a designation for an ethylene-propylene elastomer copolymer) or EPDM (ASTM D-1418-72a designation for an ethylene-propylene diene elastomer terpolymer). Also usable are high molecular weight polyisobutylene, butyl rubbers and halogenated butyl rubbers.

Preferred ethylene elastomer copolymers for use herein comprise from 30 to 90 weight percent ethylene, more preferably from 35 to 80 weight percent ethylene, and most preferably from 50 to 80 weight percent ethylene and have a Mooney viscosity (ML 1+8 at °F. between 25 and 80).

EPDM is a terpolymer of ethylene, a higher alpha-olefin such as propylene, and a nonconjugated diene. In such elastomers, the nonconjugated diolefin may be straight chain, branched chain or cyclic hydrocarbon diolefins having from 6 to 15 carbon atoms.

Of the nonconjugated dienes typically used to prepare these copolymers, preferred are dicyclopentadiene, 1,4-hexadiene, 5-methylene-2-norbornene and 5-ethylidene-2-norbornene; 5-ethylidene-2-norbornene (ENB) and 1,4-hexadiene are particularly preferred diolefins. EPDM elastomers and their method of manufacture are well known to those skilled in the art. Oil extended EPDM elastomers may also be used. Preferred EPDM elastomers contain from 30 to 90 weight percent ethylene and most preferably from 50 to 80 weight percent ethylene, and from 0.5 to 15 weight percent of the nonconjugated diolefin.

As mentioned above, the olefinic elastomer useful in this invention may also be a polyisobutylene, a copolymer of isobutylene and isoprene (generally known as butyl rubber) or a halogenated copolymer of isobutylene and isoprene (generally known as halogenated butyl rubber, such as chlorinated, brominated and chlorobrominated butyl rubber). Butyl rubber is a vulcanizable rubber copolymer containing from 85 to 99.5 percent combined isoolefin having from 4 to 8 carbon atoms and from 0.5 to 15 percent combined conjugated diolefin having from 4 to 8 carbon atoms. Such copolymers and their preparation are well known, and generally the isoolefin is a compound such as isobutylene and the diolefin is a compound such as butadiene or isoprene. Halogenated butyl rubbers are also well known: chlorinated and brominated butyl rubber generally contains from 1.0 to 3.0 weight percent bromine and from 0.05 to 0.5 weight percent chlorine.

Ethylene Copolymer Component: The ethylene copolymers include those of ethylene and alpha-olefins having 3 to 16 carbon atoms such as propylene or 1-butene. Also included are copolymers of ethylene with unsaturated esters of a lower carboxylic acid or with an unsaturated carboxylic acid. In particular, copolymers of ethylene with vinyl acetate (EVA), or with acrylic acid (EAA), or methacrylic acid (EMA), are preferred. The ethylene copolymers to be employed generally contain from 50 to 99 weight percent ethylene, most preferably from 60 to 95 weight percent ethylene.

The most preferred ethylene copolymer useful in the present invention is EVA. The EVA may have a vinyl acetate (VA) content between about 9% and 40% by weight, with about 15 to 35 weight percent VA being preferred.

VA contents below about 9 wt % do not possess sufficient flexibility and orientability for purposes of the present invention and VA contents above 40 wt % exhibit excessive tackiness. The best balance of orientability and non-tackiness occurs at VA contents between 15 and 35 wt %.

Preferred Melt Index (ASTM-D-1238, Condition E) for EVA is from 1 to 20, with 2 to 10 being most preferred.

The ethylene copolymer component normally will determine the operating temperatures of the tentering and annealing operations. These operations may be carried out at temperatures not less than 100° F. and below (preferably not more than 10° F. below) the crystalline melting point of the ethylene copolymer component. The annealing step preferably is at ±20° F. of the orienting temperature. The crystalline melting point of EVA ranges from approximately 105° F. and 200° F., depending on the VA content and MI, with the preferred EVA's having crystalline melting points between about 130° F. and 160° F. For economics, orienting temperatures of 160° F. and below are preferred.

Process Oil Component: Hydrocarbon oils useful in the present invention function as process aids whose activity is enhanced in the presence of vinyl acetate copolymers, as plasticizers producing low modulus and enhanced elasticity in the solid state and those useful are the normally liquid hydrocarbon processing and extender oils (ASTM D 2226) categorized as aromatic, highly aromatic, naphthenic and paraffinic process oils of a medium viscosity range. Oils sold under the trademarks "Flexon" and "Sunpar" have been found especially useful.

Other Additives: The composition may also include a filler material, an antiblock agent, processing aids, stabilizers and other conventional additives.

FILM PREPARATION

Resin/Blend Preparation: Preparation of compositions usable in this invention can be achieved in several different ways. The various components may be brought into intimate contact by, for example, dry blending these materials and then passing the overall composition through a compounding extruder. Alternatively, the components may be fed directly to a mixing device such as a compounding extruder, high shear continuous mixer, two roll mill or an internal mixer such as a Banbury mixer. The optional ingredients previously described can be added to the composition during this mixing operation. Overall, the objective is to obtain a uniform dispersion of all ingredients and this is readily achieved by inducing sufficient shear and heat to cause the plastic component(s) to melt. However, time and temperature of mixing should be controlled as is normally done by one skilled in the art so as to avoid molecular weight degradation.

Film Extrusion: Film from the resin compound may be manufactured by conventional tubular extrusion, (blown bubble process) or by cast extrusion, with the latter being preferred. In the cast extrusion process, the molten resin is extruded from an elongate die to the form of a web. The web is cast onto a chill roller, which solidifies the polymer, and finally wound into a roll.

The extrusion temperatures, die temperatures, and chill roll temperatures will depend on the composition employed, but generally will be in the following ranges for the compositions of the present invention prepared by cast extrusion:

| | |
|---|---|
| Melt Temperature (°F.) | 350–450 |
| Die Temperature (°F.) | 350–450 |
| Chill Roll Temperature (°F.) | 70–130 |

The process described above may also include a set of embossing rolls to chill and form the film.

Orientation: Orientation of the film may be carried out in the machine direction (MD) or the transverse direction (TD) or both directions (biaxially) using conventional equipment and processes.

For orientation in the MD, a polymeric film at an elevated temperature (but below the crystalline melting point of the polymer) is passed from a feed roll of film around two rollers driven at different surface speeds and finally to a takeup roller. The driven roller closest to the takeup roll is driven faster than the driven roller closest to the feed roll, such that the film is stretched between the driven rollers. The assembly may include a roller intermediate the second roller and takeup roller to cool the film. The second roller and the takeup roller may be driven at the same peripheral speeds to maintain the film in the stretched condition. If supplementary cooling is not used, the film will cool to ambient temperature on the take up roll.

The degree of stretch will depend upon the relative peripheral speeds of the driven rollers and the distance between the rollers. Stretch rates of 50 to 500 percent/minute will be satisfactory for most MD orientation applications.

Preferably, however, film orientation will be carried out in a tentering device to impart TD orientation to the film. The film is cast as described above or is unwound from a film roll and then gripped by the edges for processing through the orientation steps. The film is passed successively through a preheat step, a stretching step at elevated temperatures (e.g. from 100° F. to a temperature slightly below the crystalline melting point of the ethylene copolymer), an annealing step, and finally a cooling step. (Although cooling may be considered part of the annealing step, for convenience it is described as a separate step herein.) The preheat, orientation, and a portion of the annealing temperature is controlled at an elevated temperature but below the crystalline melting point of the polymer. Although not essential, it is preferred that tension be maintained on the film during the annealing and cooling steps to minimize shrinkback. Upon cooling to ambient temperature (i.e., room temperature) or near ambient, the holding force may be released. The film may contract somewhat (snapback) in the TD but will retain substantial portion of its stretched length.

The tenter operating conditions can vary within relatively wide ranges and will depend on the several variables including film composition, film thickness, degree of orientation desired, annealing conditions, etc. The following is exemplary of a process for stretching 100 micron thick film (containing EVA) from 24 inches wide to a final width of about 60 inches, using a tenter manufactured by Marshal and Williams Company of Providence, R.I.

| | ESTIMATED FILM RANGE | | | |
|---|---|---|---|---|
| Step | Broad | Preferred | Typical | Approximate Time (Sec.) |
| Preheat | 100–160° F. | 115–140° F. | 125° F. | 3.0 |
| Stretching | 100–160° F. | 115–140° F. | 125° F. | 9.0 |
| Annealing | 100–160° F. | 110–150° F. | 120° F. | 3.0 |
| Cooling | Ambient | Ambient | Ambient | 6.0 |

As indicated earlier, it is highly desirable to employ an annealing step in the process. Annealing partially relieves the internal stress in the stretched film and dimensionally stabilizes the film for storage. It has been found that by annealing the film at a temperature of ±40° F., preferably ±20° F. of the orientation temperature (but slightly below the crystalline melting point of the ethylene copolymer) eliminates undesirable shrinkage during storage. The preferred annealing temperature is between 110° F. and 130° F. Temperatures which result in excessive stress relieving should be avoided, since substantial frozen in stresses and strains should remain after the process is completed.

Annealing can be accomplished by maintaining the film in the stretched condition at the annealing temperature. Preferably, however, the annealing and cooling is carried out while permitting the film to contract slightly, but still under stress. The guide rails of the tenter can be arranged in a converging manner to provide the annealing and cooling while the film contracts. The controlled shrinkback of from 5 to 30%, preferably between 15 and 25%, of the maximum stretched width has given particularly good results in eliminating storage shrinkage. This annealing and preshrinking removes some of the film stresses and strains so that shrinkage will not occur at storage temperature. However, the annealing and cooling does not remove all the frozen in stress and strain, since upon heating to elevated temperatures above storage temperature the film will shrink.

The degree of stretching may vary within wide ranges. Draw ratios of 1.3:1 to 6:1 are possible with 2:1 to 4:1 being preferred for TD tentering. The actual stretching will occur at higher ratios (1:5 to 9:1) to allow for controlled shrinkage and snapback.

EXAMPLES

In order to demonstrate the effectiveness of the present invention, particularly in respect of improved shrink force and nonblocking properties, a series of experiments were conducted comparing performance of the film of the present invention with that of the prior art (U.S. Pat. No. 4,303,571).

Film Samples:

Samples having the compositions listed in Table I were prepared by blending the components in the weight concentrations indicated using a Banbury mixer. Each composition also included 6 wt % ethylene acrylic acid copolymer and filler material (CaCO$_3$). The resin blend was cast extruded into 150 micron (approx.) thick film using 3" extruder and 30" wide flat die.

Properties of the Film:

Each film sample was then tested for orientation/shrinkage properties with an Instron (Model 1122) in a temperature controlled chamber. One inch wide strips (cut in the TD) were taken from each sample, marked with lines 4 cm apart and then drawn to 9 cm at 10 cm/minute at an elevated temperature (140° and 145° F.). After orientation, each stretched film was quenched with water and removed from the Instron. Six film strips were drawn for each formulation and the test was run in random order in blocks of nine to eliminate systematic test error.

For each formulation, 6 strips were heated in the oven for three minutes at 150° F.; three strips with a fixed weight and the other three strips freely suspended. The film strips were removed from the oven, allowed to cool and then measured to determine the % recovery.

The % recovery was calculated by the following formula:

$$\text{Percent Recovery} = \frac{\text{Initial length}^* - \text{Final length}^{**}}{\text{Initial length}^* - 4 \text{ cm}} \times 100$$

*Initial stretched length (cm) after "snapback".
**Final length (cm) after full shrinkage at 150° F. in oven.

Table II presents the results, comparing the three sample average for each formulation of the present invention (Samples A, B and C) with the three sample average of each formulation of the prior art (Samples D, E and F).

As revealed in Table II, the percent recovery under restrained conditions Samples A, B and C was higher than that of Samples D, E, and F. Percent restrained recovery for the A, B, C sample group averaged 86.4%, whereas that of D, E F group averaged 82.3%. The shrink force, which is the force required to keep the film from shrinking can be calculated from these data. As shown in Table II, the shrink force for Samples A, B and C was substantially higher than that for Samples D, E, and F. Samples A and B exhibited particularly improved shrink force.

The higher shrink force of the Samples A, B and C permits use of a thinner gauge film at the same draw ratio as demonstrated by the following experiments.

Additional experiments were conducted to demonstrate shrinkage as a function of restraining force and shrinkage temperature. Two oriented films having the compositions of Samples A and D were prepared using a Marshall and Williams Tenter operated under typical conditions described in the Orientation section hereof. Each film thus was processed as follows:

|  | Sample A | Sample D |
|---|---|---|
| Initial Length | 22.5 inches | 22.5 inches |
| Stretch Length | 66 inches | 66 inches |
| Controlled Shrinkback Length | 60 inches | 60 inches |
| Final Stabilized Length | 50 inches | 50 inches |
| Film Guage (Initial) | 102 microns (avg) | 146 microns (avg) |
| Film Guage (Final) | 42 microns (avg) | 58 microns (avg) |
| Draw Ratio (Initial Film Gauge/Final Film Gauge) | 2.42 | 2.51 |

Strips (three for each test) of each film sample were taken and subjected to shrinkage in an oven at a controlled temperature (120° F. or 150° F.) and at the following restraining forces: 0, 12 g, 24 g, 36 g, 48 g and 60 g. Each strip was permitted to shrink for three minutes. Table III presents the three-strip average for each test. These data demonstrate that the shrink stress for the composition of the present invention was substantially higher than the composition of the prior art. Moreover, the shrink force for Sample A strips exhibited substantially higher shrink force than the Sample D strips, even though the latter strips were substantially thicker in gauge (and hence larger cross sectional area) than the former strips.

It is preferred that the thermoplastic elastomer film on the present invention have a shrink stress of at least 5,000 g/cm$^2$ at the orientation temperature, thereby providing sufficient force for its intended purpose. It is also preferred that the shrink force at 150° F. be at least 5,000 g/cm$^2$.

It is interesting to note from the Table III data that the shrinkage is generally linear with respect to the applied force. This permits calculating the shrink force and shrink stress. Note that the shrink temperature of 150° F. is higher than the orientation temperature and 120° F. is lower than that temperature. The higher temperature results in more shrinkage since more stresses are relieved.

Antiblock Properties

The composition of the present invention also exhibits good antiblocking properties in comparison to films of the compositions of samples D, E and F.

Multi-layers of each film Sample A, B, C, D, E and F compositions (150 micron thick unoriented) were stored for several weeks. The films were then manually separated and subjectively rated for blocking (i.e., resistance to unwinding).

| Sample | Observed Blocking |
|---|---|
| A | No blocking |
| B | Slight tackiness |
| C | No blocking |
| D | Fully Blocked |
| E | Partial Blocking |

| Sample | Observed Blocking |
|--------|-------------------|
| F | Partial Blocking |

Antiblock property is important in unwinding the film during tentering or during unwinding the oriented film of use. Sticking of the film is undesirable since it slows down the operation or renders the process inoperable.

THERMOPLASTIC ELASTOMER WITH COATING

Another embodiment of the present invention is directed specifically at solving blocking associated with thermoplastic elastomers, particularly those containing process oil and for high VA, ethylene vinyl acetate. These films are tacky by nature and require antiblock agents such as particulate silica. The elastomer present in these blends appears to prevent uniform distribution of particulate antiblock in the resin with the result that the antiblock does not become uniformly distributed on the film surface.

In one aspect of this invention, a thin coating of an ethylene polymer or copolymer is provided on one or both sides of the base thermoplastic elastomer (core). The subsequent stretching of the film further reduces the thickness of the coating. The coating thickness ratio (final/initial) is in proportion to the draw ratio. Preferably the coating comprises conventional low density polyethylene (LDPE) having a high Melt Index (in excess of 3.0). Other ethylene polymers and copolymers that may be used as the coating include linear low density polyethylenes (LLDPE), EVA, etc. These materials should have relatively high Melt Indices (in excess of 3.0, preferably 5.0–30.0) and should be capable of high draw down, making them suitable for coextrusion with the base resin (core layer), and should possess nontacky properties or be treatable to a nontacky condition (e.g. addition of antiblock). Coextrusion is the preferred coating method, but extrusion coating may also be used.

It is essential that the coating be sufficiently thin to avoid interference with the shrink and elastic properties of the thermoplastic elastomer but sufficiently thick to impart antiblock properties to the composite. This latter requirement means that the coating must be capable of carrying uniformly distributed therein particulate finely divided antiblock agent.

As applied to the core or base resin, the coating will comprise between 2 to 15, preferably 2 to 10 weight percent of the composite and not more than 25 microns thick. Following the orientation, the coating will be reduced to a thickness of not more than 7 microns and as thin as possible. Preferred thickness after orientation is between 1 and 5 microns.

The amount of antiblock in the coating may range from 500 to 5,000 ppm, with 1,000 to 4,000 being preferred. The coating may also include slip agents such as erucamide and oleamide.

The coating may be applied to only one side of the base resin but preferably is applied to both sides.

It should be noted that the invention comprising the coating embodiment is not restricted to the thermoplastic elastomer composition specified in the earlier description of the "Elastomer Component" as the core (although these compositions are the most preferred) but may instead contemplate the use of any thermoplastic elastomer resin composition. The preferred resin composition comprises from 10 to 55 wt % of the elastomer component, from 35 to 80 wt % of the EVA component, and from 2 to 25 wt % of the processing oil component.

OPERATION

In practice, the process of the present invention may be carried out using an in-line operation wherein the extruder and orientation system (e.g., tenter) are arranged in tandem to form the film by casting or melt embossing followed by film orientation. Alternatively, these operations may be carried out separately.

In a preferred embodiment, the compounded resin containing the three main ingredients along with the other additives is introduced into an extruder and extruded into a web from a flat or coat-hanger type die and melt embossed through counter rotating chill roll and embossing rolls. The film thickness may vary from 50 to 400 microns before orientation and from 10 to 200 microns after orientation. Preferably the film will have a final stabilized thickness of between 10 and 100 microns after orientation and annealing. The film is wound on a take up roll and transferred to tentering equipment or processed in line with the tenter.

The edges of the film are gripped in the tentoring equipment and passed successively through (a) a preheat stage, (b) an expansion stage wherein the film is stretched laterally at an elevated temperature, (c) an annealing stage and, finally, (d) a cooling stage where the stretched film is cooled to near ambient temperature. Once the restraining force is released, the film snaps back slightly but retains most of its stretched length. This film is wound on a take up roll, ready for transport or use.

The dimensionally stable film may be secured to a flexible substrate and heated causing it to shrink. Shrinkage commences at a few degrees above storage temperature, reaching maximum at some temperature above the orientation temperature.

In the embodiment for the coating of a thermoplastic elastomer, the operation may be the same as above except that in extrusion of the resin to form the film, a coextrusion die may be used to apply the thin coating on one or both sides of the thermoplastic elastomer core.

In either embodiment, the film produced has excellent shrink force properties and good antiblock properties.

TABLE I

| Component | FILM SAMPLE | | | COMPARATIVE FILM SAMPLES | | |
|---|---|---|---|---|---|---|
| | A | B | C | D | E | F |
| Elastomer[1] | 22.6 wt % | 27.0 wt % | 39.4 wt % | 39.4 wt % | 22.6 wt % | 27.0 wt % |
| EVA[2] | 71.7 wt % | 66.2 wt % | 55.0 wt % | 41.6 wt % | 58.4 wt % | 49.6 wt % |
| Process Oil[3] | 5.6 wt % | 6.8 wt % | 5.6 wt % | 19.0 wt % | 19.0 wt % | 23.4 wt % |

TABLE I-continued

| | FILM SAMPLE | | | COMPARATIVE FILM SAMPLES | | |
|---|---|---|---|---|---|---|
| Component | A | B | C | D | E | F |
| MI | 3.25 | 2.63 | 2.16 | 2.66 | 6.6 | 10.3 |

[1] Ethylene-propylene copolymer rubber marketed as Vistalon 3708 by Exxon Chemical Company.
[2] LD-767 (28 wt % VA) sold by Exxon Chemical Company.
[3] Arco Prime 350 sold by Arco Chemical Company.

TABLE II

| Sample | Test | Initial Gauge (microns) | Initial Length (cm) | Final Length (cm) | % Recovery (Actual Draw) | Calculated Shrink Force (grams) |
|---|---|---|---|---|---|---|
| A | Free | 157.5 | 8.0 | 4.3 | 91.6 | |
| | Restrained | 149.9 | 8.0 | 4.5 | 87.5 | 222 |
| B | Free | 157.5 | 8.0 | 4.4 | 90.0 | |
| | Restrained | 157.5 | 8.0 | 4.5 | 86.8 | 450 |
| C | Free | 152.4 | 8.0 | 4.4 | 89.9 | |
| | Restrained | 154.9 | 7.9 | 4.6 | 85.6 | 169 |
| D | Free | 152.4 | 8.1 | 4.3 | 91.9 | |
| | Restrained | 149.9 | 8.2 | 4.7 | 82.2 | 134 |
| E | Free | 160.0 | 7.9 | 4.3 | 91.5 | |
| | Restrained | 162.6 | 8.0 | 4.7 | 82.6 | 148 |
| F | Free | 157.18 | 8.1 | 4.4 | 88.5 | |
| | Restrained | 152.4 | 8.1 | 4.7 | 81.3 | 127 |

TABLE III

| | Restraining Force (grams) | Strip Length after shrinkage (cm) | | | | | | Shrink Force (grams)** | Area (cm$^2$) | Shrink Stress g/cm$^2$ |
|---|---|---|---|---|---|---|---|---|---|---|
| | | 0 | 12 | 24 | 36 | 48 | 60 | | | |
| Sample A* | 120° F. | 8.08 | 8.33 | 3.62 | 8.89 | 9.08 | 9.33 | 91 | .010 | 9,100 |
| | 150° F. | 5.83 | 6.26 | 6.98 | 7.73 | 8.38 | 9.43 | 73 | .011 | 6,636 |
| Sample D* | 120° F. | 8.57 | 8.82 | 9.15 | 9.41 | 9.74 | 10.01 | 59 | 0.14 | 4,214 |
| | 150° F. | 5.73 | 6.23 | 6.91 | 7.90 | 8.75 | 10.04 | 65 | .016 | 4,063 |

*three strip sample average
**calculated

What is claimed is:

1. A composite comprising
   (a) a first layer comprising an oriented film having a blend composition comprising from 10 to 40 weight percent of an olefinic elastomers, from 2 to 10 weight percent of a normally liquid process oil, and from 50 to 80 weight percent of a thermoplastic ethylene copolymer, said film being stretch oriented in draw ratio of between 1.3:1 and 6:1 and being dimensionally stable, thermally unstable in the stretch oriented condition and contractible to a thermally stable and elastic condition by application of heat; and
   (b) a second layer of stretch oriented film adhered to said first layer and comprising a polymer or copolymer of ethylene having a Melt Index of at least 3.0, said second layer being no thicker than 7 microns in the stretched condition and comprising from 2 to 15 weight percent of the composite.

2. A composite as defined in claim 1 wherein said second layer is coextruded with said first layer.

3. A composite as defined in claim 1 wherein the ethylene polymer or copolymer comprises LDPE having a Melt Index between 5 and 30.

4. A composite as defined in claim 3 wherein the second layer of LDPE is coextruded onto each side of said first layer.

5. An oriented composite comprising
   (a) a layer of a thermoplastic elastomer film containing from 2 to 25 wt % of a process oil; and
   (b) a coating of a polymer or copolymer of ethylene coextruded with said first layer and having a Melt Index of between 5 and 30, said coating being less than 7 microns thick in the oriented condition and containing from 500 to 5,000 ppm of a particulate antiblock agent.

6. A composite comprising
   (a) a layer of flexible substantially inelastic material;
   (b) a layer of film comprising an oriented film having a blend composition comprising from 10 to 40 weight percent of an olefinic elastomers, from 2 to 10 weight percent of a normally liquid process oil, and from 50 to 80 weight percent of a thermoplastic ethylene copolymer, said film being stretch oriented in draw ratio of between 1.3:1 and 6:1 and being dimensionally stable, thermally unstable in the stretch oriented condition and contractible to a thermally stable and elastic condition by application of heat, secured to the layer of flexible substantially inelastic material whereby application of heat contracts both the film and the layer of flexible, substantially inelastic material.

* * * * *